(12) United States Patent
Niiya et al.

(10) Patent No.: US 6,674,503 B2
(45) Date of Patent: Jan. 6, 2004

(54) LIQUID CRYSTAL DISPLAY ELEMENT AND MANUFACTURING METHOD THEREOF

(75) Inventors: Hirotaka Niiya, Tenri (JP); Ippei Inou, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/746,851

(22) Filed: Dec. 21, 2000

(65) Prior Publication Data
US 2001/0005255 A1 Jun. 28, 2001

(30) Foreign Application Priority Data

Dec. 24, 1999 (JP) .......... 11-368303
Sep. 26, 2000 (JP) .......... 2000-292956

(51) Int. Cl.[7] .......... G02F 1/13
(52) U.S. Cl. .......... 349/155
(58) Field of Search .......... 349/155

(56) References Cited

U.S. PATENT DOCUMENTS

| | | | |
|---|---|---|---|
| 5,044,733 A | * 9/1991 | Kamoi et al. | 349/155 |
| 5,130,831 A | * 7/1992 | Kohara et al. | 349/155 |
| 5,231,527 A | * 7/1993 | Takanashi et al. | 349/155 |
| 5,307,190 A | * 4/1994 | Wakita et al. | 349/155 |
| 5,513,026 A | * 4/1996 | Suzuki et al. | 349/155 |
| 5,594,572 A | * 1/1997 | Fukutani et al. | 349/155 |
| 5,739,888 A | 4/1998 | Ogura et al. | 349/153 |
| 5,812,232 A | * 9/1998 | Shiroto et al. | 349/157 |
| 6,144,435 A | * 11/2000 | Yokoyama et al. | 349/155 |

FOREIGN PATENT DOCUMENTS

| | | | |
|---|---|---|---|
| CN | 1117145 A | 2/1996 | G02F/1/1333 |
| CN | 1165312 A | 11/1997 | G02F/1/1339 |
| JP | 5-142506 | 6/1993 | |
| JP | 6-281941 | 10/1994 | |
| JP | 09-090372 | 4/1997 | G02F/1/1339 |
| KR | 1998-083602 | 5/1998 | G02F/1/1341 |

* cited by examiner

*Primary Examiner*—James Dudek
(74) *Attorney, Agent, or Firm*—Edwards & Angell, LLP; David C. Conlin, Esq.; Richard J. Roos, Esq.

(57) ABSTRACT

A liquid crystal display element includes a pair of substrates made of plastic, a liquid crystal sandwiched between the pair of substrates, and a plurality of spacers for maintaining a gap d between the pair of substrates, which are sandwiched between the pair of substrates, and when x is an average value of thickness of the plurality of spacers in a state without a load in such a direction that the plurality of spacers are sandwiched between the pair of substrates, $d < x \leq 1.1d$ is satisfied. Further, in the liquid crystal display element, a numerical density of the spacers is set to be not less than 240 pieces/mm$^2$ and not more than 300 pieces/mm$^2$. Further, in the liquid crystal display element, an elastic modulus of the spacers is set to be larger than that of the pair of substrates. As a result, in the liquid crystal display element, color shading is suppressed while suppressing generation of bubbles in a vacuum region and reduction in contrast, thus obtaining desirable display quality of a display image.

20 Claims, 7 Drawing Sheets

A CELL GAP IS SMALL DUE TO
A LARGE SPACER INTERVAL

LIQUID CRYSTAL DISPLAY ELEMENT AND MANUFACTURING METHOD THEREOF

FIELD OF THE INVENTION

The present invention relates to a liquid crystal display element including a spacer which is sandwiched between a pair of substrates made of plastic and the like, and a manufacturing method thereof.

BACKGROUND OF THE INVENTION

Conventionally, as a pair of substrates for composing a liquid crystal display element by holding a liquid crystal, substrates made of plastic and the like have been used because of superior impact resistance. However, a substrate made of plastic and the like has a problem of an inferior gas barrier, i.e., gas is easily transmitted through the substrate, thereby arising such a problem that the gas transmitted through the substrate dissolves in a liquid crystal layer so as to allow bubbles to be generated more easily.

More specific explanation is provided as follows. When composing a liquid crystal display element, a polarizer, etc. are attached to a substrate. Since the substrate and the polarizer generally have different elongation ratio, due to environmental change (change in a temperature, humidity, etc.) is deformed the substrate to a bimetallic form. A cell gap between the pair of substrates is changed due to the deformation of the substrate, thereby changing pressure between the pair of substrates sandwiching the liquid crystal. In addition, the change in the pressure causes the gas that dissolved in the liquid crystal layer to be vaporized, and the bubbles are generated.

On the other hand, a technique disclosed in Japanese Unexamined Patent Publication No. 281941/1994 (Tokukaihei 6-281941 published on Oct. 7, 1994), etc., is such that, by increasing the number of spacer sandwiched by the pair of substrates, deformation of the substrate particularly under a high temperature and high humidity is reduced, thereby attempting to suppress generation of the bubbles in the case of using a substrate of an inferior gas barrier.

Further, the foregoing publication also discloses a technique of adopting a spacer of an adhesive type, suppressing movement of the spacer by adhering the spacer to the substrate in a manufacturing process, and preventing the deformation of the substrate.

Note that, such a liquid crystal display element is commonly formed by injecting a liquid crystal between a pair of substrates, surroundings of which are sealed with a sealing agent by a vacuum impregnation method, except a liquid crystal injection slit (liquid crystal impregnation slit), and sealing the liquid crystal injection slit with end seal (sealing agent) made of UV setting resin, etc. Here, for example, a technique disclosed in Japanese Unexamined Patent Publication No. 142506/1993 (Tokukaihei 5-142506 published on Jun. 11, 1993), etc., is such that, after injecting the liquid crystal, a panel which is made up of a pair of substrates is pressed so as to squeeze out the liquid crystal, then, the liquid crystal injection slit is sealed, thereby uniforming the cell gap between the pair of substrates.

However, in the case of using the spacer of the adhesive type disclosed in the publication No. 6-281941, as the spacer of the adhesive type is adopted a spacer, a surface of which is coated with a thermoplastic adhesive. In that case, the unit cost of the spacer becomes high, thereby arising a problem of increase in the cost of a liquid crystal display element.

Further, in that case, adhesion of the spacer to the substrate is carried out simultaneously with the heat treatment for setting a seal material in the manufacturing process, but when using a UV setting resin as the seal material, a heat treatment process should separately be provided, thereby arising problems of complicated processes and increase in cost.

Further, in that case, since the thermoplastic adhesive exists inside the liquid crystal, the thermoplastic adhesive dissolves in the liquid crystal when performing the heat treatment, thereby possibly resulting in exacerbation of the performance of the liquid crystal.

Further, in the technique disclosed in the publication No. 6-281941, an effect is produced with respect to the generation of bubbles due to the deformation of the substrate under a high temperature and high humidity. However, when the number of the spacers is excessively large, a relative quantity of the liquid crystal inside the cell is reduced. In such case where the relative quantity of the liquid crystal is small, and particularly, in case where the liquid crystal is kept under a condition of a low temperature and the liquid crystal itself shrinks largely, there arises such a problem that a mechanical impact from outside allows bubbles to be readily generated in a vacuum region (a space where the liquid crystal is eliminated and substantially no gases are included).

Furthermore, when the number of the spacers is excessively large, a problem of reduction in contrast of the liquid crystal display element arises.

On the other hand, when the number of the spacers is excessively small, the relative quantity of the liquid crystal inside the cell is increased, and the degree of generation of bubbles due to the mechanical impact (characteristic of resistance to a mechanical impact bubbles) is increased. However, the small number of the spacers results in a reduction in a support between the substrates. Consequently, there arises problems such as readily deformation of a substrate, deterioration of resistance to pressure, and non-uniformity in cell gap.

Particularly, when using a substrate which is made of a material such as plastic having smaller stiffness than that of glass and the like, it is necessary to attain stiffness of the liquid crystal display element by increasing a spacer density to a certain extent.

Meanwhile, in the case of an STN (Super-Twisted Nematic) type liquid crystal cell which requires highly accurate adjustment of cell gap, it is crucial to maintain the cell gap uniformly. Specifically, in the STN type liquid crystal cell, a product $\Delta n d$ (retardation) of a cell gap d and birefringence $\Delta n$ of a liquid crystal injected inside the cell determines background color gradations, and therefore a partial variation in the cell gap d results in color shading.

In order to uniform the cell gap d, the application of pressure to a panel prior to sealing of the liquid crystal injection slit as disclosed in the publication No. 5-142506 is effective, but when the pressure here is high, the liquid crystal is discharged excessively. Therefore, when the panel after sealing is left to stand in an environment of a low temperature, a liquid crystal inside the panel shrinks so as to form bubbles in the vacuum region inside the panel.

Figure 7:
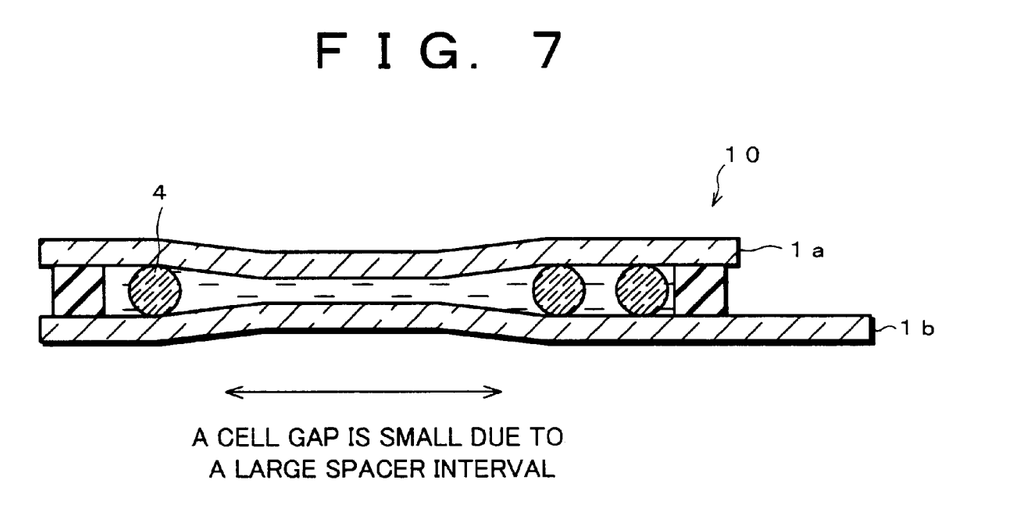
FIG. 7 is a cross sectional view showing a state of a liquid crystal display element whose spacer density is low.

Further, in the case of a panel using a plastic substrate in particular, when the spacer density (spacer scattering density) is low, as shown in FIG. 7, a substrate is bent in accordance with presence or absence of the spacer. FIG. 7 is a cross sectional view showing a state of a liquid crystal display element 10 including spacers 4 whose density is low.

In the liquid crystal display element 10, a display side substrate 1a and a rear side substrate 1b are bent inward at a portion where an interval between the spacers 4 is wide, and thereby a cell of this portion becomes small. This is recognized as color shading in the case of the STN type liquid crystal cell. Furthermore, the spacers 4 can uniformly support the display side substrate 1a and the rear side substrate 1b when the spacers 4 are completely spaced equidistantly, but it is difficult to attain such complete equidistant spacing by a common spacer scattering technique. Consequently, since the support by the spacers 4 varies depending on a location, the cell gap fails to be uniform, thereby occasionally emphasizing the color shading.

On the other hand, when the spacer density is high, bending of the display side substrate 1a and the rear side substrate 1b is suppressed, and moreover, the addition of pressure allows the spacers 4 to support the substrates uniformly, and thus it is relatively easy to uniform the cell gap. However, since a quantity of a liquid crystal occupying a space inside the cell decreases, the bubbles in the vacuum region can be readily formed when left to stand in the environment of a low temperature.

SUMMARY OF THE INVENTION

The present invention is attained so as to solve the foregoing problems, and it is an object thereof to provide a liquid crystal display element having a desirable display quality of a display image, avoiding complication of manufacturing processes to the utmost while securing stiffness of a liquid crystal panel, suppressing fluctuations in a cell gap due to deformation of a substrate when applying pressure so as to suppress occurrence of color shading, and further, suppressing reduction in contrast and generation of bubbles in a vacuum region due to mechanical impact from outside under a low temperature, and to provide a manufacturing method thereof.

In order to attain the foregoing object, the liquid crystal display element according to the present invention includes: a pair of substrates made of plastic; a liquid crystal sandwiched between the pair of substrates; and a plurality of spacers for maintaining a gap d between the pair of substrates, which are sandwiched between the pair of substrates; wherein, when x is an average value of thickness of the plurality of spacers in a state without a load in such a direction that the plurality of spacers are sandwiched between the pair of substrates, $d<x\leq 1.1d$ is satisfied.

With the foregoing arrangement, the plurality of spacers are provided so as to maintain the distance d between the pair of substrates for holding the liquid crystal therebetween, and the average thickness x of the plurality of spacers (provided that the thickness in such a state that is not held between the pair of substrates without a load) (hereinafter referred to as "thickness of spacers x") is larger than the distance d. Namely, when the liquid crystal display element is arranged, the pair of substrates and the plurality of spacers are compressed in a direction of the thickness.

Therefore, stress by compression occurs in a contact portion of a display side substrate and a rear side substrate making up the pair of substrates, and the plurality of spacers. This stress produces a force to act in a direction of the thickness of the plurality of spacers, and friction between the pair of substrates and the plurality of spacers, which acts in the direction of the surface of the pair of substrates, is increased by the force.

Consequently, with this arrangement, the spacers are more firmly fixed on the pair of substrates than an arrangement in which the cell gap d and the particle diameter of the spacers are the same, thereby suppressing the movement of the spacers.

Accordingly, with this arrangement, without using adhesive type spacers to which an adhesive is applied as in a conventional arrangement, the spacers can firmly be fixed by changing adjustment of the size of the spacers and the distance d between the substrates in manufacturing processes. Therefore, problems such as complication of the manufacturing processes as in the case of using the adhesive type spacers can be prevented.

Thus, by firmly fixing the spacers, in such a case that a display surface of the liquid crystal display element is pressed, variations in the distance d between the substrates due to the movement of the spacers can be prevented, thereby suppressing occurrence of color shading in an displayed image due to the variations in the distance d between the substrates.

Meanwhile, when the thickness of the spacers x exceeds 1.1 times the distance d between the substrates, the amount of deformation of substrates and spacers becomes excessively large. Consequently, problems such as difficulty in uniformly adjusting the distance between the substrates to be a predetermined value, and damages in transparent electrodes formed on the substrates may arise.

On the other hand, with the foregoing arrangement, the thickness x of the spacers is set to be not more than 1.1 times the distance d between the substrates, thereby preventing excessive deformation of the substrates and spacers, and the foregoing problems can be prevented.

Thus, with the foregoing arrangement, in the liquid crystal display element, by setting the thickness x of the spacers to be larger than the distance d between the substrates and not more than 1.1 times the distance d between the substrates, problems such as the complication of the manufacturing processes and damages in the transparent electrodes can be prevented, while firmly fixing the spacers, thereby suppressing generation of color shading, thus improving display quality of the liquid crystal display element.

Further, in the liquid crystal display element of the present invention, it is preferable that a numerical density of the spacers is in a range of not less than 240 pieces/mm$^2$ and not more than 300 pieces/mm In the liquid crystal display element, when the numerical density of the spacers becomes large, a relative quantity of the liquid crystal is decreased. In a state that the relative quantity of the liquid crystal is small, as discussed, when a liquid crystal display element under a low temperature is given a mechanical impact from outside, bubbles in the vacuum region are likely to be generated.

With the foregoing arrangement, the numerical density of the spacers is set to be not more than 300 pieces/mm$^2$, thereby suppressing generation of bubbles in the vacuum region due to decrease in the relative quantity of the liquid crystal.

Further, when the numerical density of the spacers is not more than 300 pieces/mm$^2$, deterioration in contrast of the liquid crystal display element caused by scattering of light due to the spacers can also be prevented.

With the foregoing arrangement, further, the numerical density of the spacers is set to be not less than 240 pieces/mm$^2$. Consequently, stiffness of the liquid crystal display element is improved, and the pair of substrates are less likely to be deformed when pressure is applied to the display surface, thereby suppressing variations in the distance d between the substrates, and further suppressing generation of color shading.

Thus, with the foregoing arrangement, generation of bubbles in the vacuum region due to decrease in the relative quantity of the liquid crystal, reduction in contrast, and generation of color shading can be suppressed, thus improving display quality of the liquid crystal display element.

In the liquid crystal display element of the present invention, further, it is preferable that an elastic modulus of the spacers is larger than that of the pair of substrates.

With the foregoing arrangement, since the elastic modulus of the spacers is larger than that of the substrates, at a portion where the spacers and the pair of substrates come in contact, the amount of deformation in the substrates increases, thereby forming concave portions on the surfaces of the substrates which were originally flat. Namely, the spacers support the substrates while slightly sinking into the substrates.

In case where the surfaces of the substrates are flat, the spacers are held mainly by friction between the spacers and the substrates. However, when the concave portions are formed on the surfaces of the substrates, the spacers are more firmly held not only by friction but by sinking into the concave portions.

Consequently, with the foregoing arrangement, an effect of suppressing the movement of the spacers is further improved, thereby further effectively suppressing generation of color shading, thus improving display quality of the liquid crystal display element.

In order to attain the foregoing object, a manufacturing method of a liquid crystal display element which includes a pair of substrates made of plastic, a plurality of spacers for maintaining a gap between the pair of substrates and a liquid crystal between the pair of substrates, including the steps of:
 (a) disposing the plurality of spacers between the pair of substrates, and forming a liquid crystal injection slit for injecting the liquid crystal between the pair of substrates while bonding the pair of substrates with a seal material which is provided around a region where the plurality of spacers are disposed;
 (b) injecting the liquid crystal between the pair of substrates via the liquid crystal injection slit; and
 (c) sealing the liquid crystal injection slit while adjusting pressure which is applied to the pair of substrates so as to adjust the gap between the pair of substrates in which the liquid crystal was injected,
 wherein:
  when x is an average value of thickness of the plurality of spacers in a state without a load in such a direction that the plurality of spacers are sandwiched between the pair of substrates,
  when adjusting the pressure, the gap d between the pair of substrates at completion of the liquid crystal display element is adjusted so as to satisfy $d < x \leq 1.1d$.

With the foregoing arrangement, by adjusting pressure by applying pressure to the substrates to which the liquid crystal was injected and adjusting the pressure, the distance d and the thickness x of the spacers at the time of completion of the liquid crystal display element is set to satisfy $d < x \leq 1.1d$. Consequently, since the substrates and the spacers are in a state of being compressed in directions of the thickness, thereby, as discussed, much firmly fixing the spacers. Accordingly, problems such as complication of the manufacturing processes can be prevented while improving display quality of the liquid crystal display element by a relatively easy method.

The manufacturing method of the liquid crystal display element of the present invention, further, it is preferable to dispose the spacers between the pair of substrates so that its numerical density is in a range of not less than 240 pieces/mm$^2$ and not more than 300 pieces/mm$^2$.

With the foregoing arrangement, as discussed, generation of bubbles in the vacuum region due to decrease in the relative quantity of the liquid crystal can be suppressed, while increasing stiffness and improving display quality and reliability of the liquid crystal display element by a relatively easy method.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following will explain one embodiment of the present invention with reference to FIGS. 1(a) through 6.

FIG. 1(a) is a plan view of a liquid crystal display element 10 according to the present embodiment, and FIG. 1(b) is a cross sectional view of the liquid crystal display element of FIG. 1(a) taken along the A—A line. Note that, FIGS. 1(a) and 1(b) show only basic components in an arrangement of the present liquid crystal display element. In addition, in FIGS. 1(a) and 1(b), a cell gap (cell thickness) Cg which is a gap between a pair of substrates 1, spacers 4, and the like are exaggerated for purposes of illustration.

The present liquid crystal display element 10 is made up of, as a basic arrangement, a display side substrate 1a and a rear side substrate 1b as a pair of substrates (upper and lower substrates) 1, a seal 2 for bonding the pair of substrates 1 together, a liquid crystal 3 sandwiched between the pair of substrates 1, and a plurality of spacers 4.

The present liquid crystal display element 10, for the purposes of improving resistance to impact and reducing the weight, employs a substrate made of a material such as plastic (for example, polyethersulfone, etc.) as the pair of substrates 1.

With regard to the display side substrate 1a and the rear side substrate 1b making up the pair of substrates 1, on surfaces thereof facing each other (hereinafter referred to as "inner surface"), transparent electrodes (ITO films), which are not shown, are respectively formed. Besides, a pixel as a minimum unit of image display is formed in accordance with a region separated by the transparent electrodes.

Note that, the present embodiment is not limited to the driving method of the liquid crystal display element 10, but, for example, a simply matrix driving method and an active matrix driving method, etc., can also be adopted. In addition, on the inner surfaces of the pair of substrates 1 are suitably formed a conductive wiring, a switching element, an insulating film, etc., in accordance with the driving method adopted. Furthermore, in an interface between each of the pair of substrates 1 and the liquid crystal 3 is formed an alignment layer which is subjected to alignment processing, as required.

Further, the pair of substrates 1, in a state of sandwiching the spacers 4, are bonded with the seal 2 which is provided along the outer regions of the pair of substrates 1. The spacers 4, each of which is a sphere having a uniform particle diameter and being made of inorganic substance silica, plastic, etc., have a function to maintain a constant gap (cell gap Cg, alternatively shown as cell gap d when indicating the size thereof) between the pair of substrates 1. Between the pair of substrates 1 is held the liquid crystal 3, which is hermetically sealed with the seal 2 with respect to the outside.

As the liquid crystal 3, as discussed later, for example, liquid crystal material composing an STN liquid crystal cell, i.e., liquid crystal material showing an STN mode can be employed, provided that other liquid crystal material except the foregoing may also be used as the liquid crystal 3.

Note that, in order to utilize the present liquid crystal display element as an actual image display device, in addition to the foregoing arrangement, components such as a polarizer and a color filter are adhered to an outer surface (plane on the reverse side of the inner surface) of either one or both of the display side substrate 1a and the rear side substrate 1b. In addition, in the present liquid crystal display element 10, a lighting device for lighting the present liquid crystal display element 10, and a reflector are incorporated. Since arrangements thereof are the same as an arrangement of a conventional liquid crystal display element, explanation thereof will be omitted.

Next, the following will explain a relationship between the spacers 4 and the cell gap Cg in the present liquid crystal display element 10.

In the present liquid crystal display element 10, the particle diameter (diameter; this refers to an average value of a diameter of a spacer in an effective pixel area; this is the same hereinafter) of each of the spacers 4 is larger than the cell gap d. Namely, the present liquid crystal display element 10, in a completed state, has an arrangement in which a load is applied with respect to the pair of substrates 1 in such a direction that the pair of substrates 1 are drawn to each other, and the spacers 4 and the pair of substrates 1 are partially deformed (elastic deformation) so as to maintain the cell gap d which is smaller than the particle diameter of the spacers 4. A manufacturing method of the liquid crystal display element 10 having the foregoing arrangement will be explained later. Note that, the cell gap d is an average value among flat portions other than the deformed portion between the inner surfaces of the pair of substrates 1 in the effective pixel area of the liquid crystal display element 10.

With this arrangement, since the pair of substrates 1 and the spacers 4 are in contact while pressing one another, a movement of the spacers 4 in a direction of a surface of the pair of substrates 1 can be suppressed. Consequently, by uniformly dispersing the spacers 4 when manufacturing the liquid crystal display element 10, even in case where an impact from the outside is applied with respect to the display side 1d and the like after completion of the liquid crystal display element 10, the movement of the spacers 4 can be suppressed. As a result, the cell gap d is prevented from varying, thereby avoiding occurrence of color shading due to variations of the cell gap d.

Meanwhile, in the present liquid crystal display element 10, further, in order that an elastic modulus (vertical elastic modulus, Young's modulus) of the pair of substrates 1 becomes smaller than that of the spacers 4, materials of these components are selected (specific materials will be explained later).

With this arrangement, at a portion where the spacers 4 and the pair of substrates 1 are in contact by pressing one another, the amount of deformation in the pair of substrates 1 increases, thereby forming concave portions 1c on the inner surfaces of the pair of substrates 1 which were originally flat. Namely, as shown in FIG. 1(b), the spacers 4 having a larger particle diameter than the cell gap d support the pair of substrates 1 like a bridge, while slightly sinking into the pair of substrates 1.

In case where the inner surfaces of the pair of substrates 1 are flat, the spacers 4 are held mainly by friction between the spacers 4 and the pair of substrates 1. However, when the concave portions 1c are formed on the inner surfaces of the pair of substrates 1, the spacers 4 are more firmly held not only by friction but by sinking into the concave portions 1c. Consequently, with the foregoing arrangement, an effect of suppressing the movement of the spacers 4 is further improved.

Further, in case where the elastic modulus of the pair of substrates 1 is larger than that of the spacers 4, the amount of deformation of the spacers 4 is likely to lack uniformity, and the cell gap d may lack uniformity.

Here, in this case, an elastic modulus of either one of the display side substrate 1a and the rear side substrate 1b is set to be smaller than the elastic modulus of the spacers 4, but it is also possible that the elastic modulus of either one of the display side substrate 1a and the rear side substrate 1b is set to be smaller than the elastic modulus of the spacers 4.

The foregoing arrangement, which is different from the arrangement adopting the spacer of the adhesive type explained in the Background of the Invention, can prevent increase in cost of a device due to increase in a unit cost of spacers caused by the application of a thermoplastic adhesive over the surfaces of the spacers. In addition, since a mixture of the thermoplastic adhesive, etc., into the liquid crystal 3 can be prevented, a problem such as deterioration in the property of the liquid crystal 3 can also be prevented.

Note that, the foregoing explanation has been made through the case where spacers each of which being spherical in shape is used as the spacers 4, but spacers each having the shape of a cylindrical column or other shape may be adopted instead. In that case, the thickness (thickness in the direction that is held by the pair of substrates 1) of the spacers adopted is to correspond to the particle diameter herein. For example, in the case of a spacer having the shape of a cylindrical column, the diameter of a circle, which is a cross section of the spacer made by cutting through a plane in a direction that intersects perpendicularly to a lengthwise direction, corresponds to the particle diameter.

Thus, the liquid crystal display element 10 includes a pair of substrates 1 made of plastic, a liquid crystal 3 and a plurality of spacers 4 which are sandwiched by the pair of substrates 1, and a gap (cell gap d) between mutually facing surfaces (inner surfaces) of the pair of substrates 1 is smaller than the thickness of the plurality of spacers 4 in the direction that the plurality of spacers 4 are held by the pair of substrates 1, which is a thickness (particle diameter) in the state that is not held by the pair of substrates 1.

In this arrangement, the pair of substrates 1 and the plurality of spacers 4 are in a state under compression in a direction of their thickness. Therefore, stress by compression occurs in a contact portion of the display side substrate 1a and the rear side substrate 1b making up the pair of substrates 1, and the plurality of spacers 4. This stress produces a force to act in a direction of the thickness of the plurality of spacers 4, and friction between the pair of substrates 1 and the plurality of spacers 4, which acts in the direction of the surface of the pair of substrates 1, is increased by the force.

Consequently, with this arrangement, the spacers 4 are more firmly fixed on the pair of substrates 1 than an arrangement in which the cell gap d and the particle diameter of the spacers 4 are the same, thereby suppressing the movement of the spacers 4.

Thus, by firmly fixing the spacers 4, in such a case that the display side 1d of the liquid crystal display element 10 is pressed, variations in the cell gap d due to the movement of the spacers 4 can be prevented, thereby suppressing occurrence of color shading in an displayed image due to the variations in the cell gap d.

Further, the elastic modulus of the spacers 4 is preferably larger than the elastic modulus of the pair of substrates 1.

With this arrangement, in a portion where the spacers 4 and the pair of substrates 1 are in contact with one another, the amount of deformation of the pair of substrates 1 becomes larger, thereby forming the concave portions 1c on the inner surfaces of the pair of substrates 1 which were originally flat. Namely, the spacers 4 support the pair of substrates 1 while slightly sinking into the pair of substrates 1.

When the inner surfaces of the pair of substrates 1 are flat, the spacers 4 are maintained mainly by friction between the spacers 4 and the pair of substrates 1. However, when the concave portions 1c are formed on the inner surfaces of the pair of substrates 1, the spacers 4 are more firmly held not only by friction but by sinking into the concave portions 1c. Consequently, with the foregoing arrangement, an effect of suppressing the movement of the spacers 4 is further improved.

Next, the following will explain a manufacturing method of the liquid crystal display element 10 having the foregoing arrangement. Note that, it is assumed that the foregoing transparent electrodes and alignment layers are formed on the display side substrate 1a and the rear side substrate 1b. A forming method of these components are the same as that in a conventional manufacturing process of a liquid crystal display element, and therefore explanation thereof will be omitted.

In the manufacturing process of the present liquid crystal display element 10, the major steps of applying a seal material, spraying spacers, bonding substrates, setting the seal material, separating a panel, injecting a liquid crystal, and sealing an injection slit are successively carried out. These steps will be explained below in this order.

In the step of applying a seal material, a seal material for forming the seal 2 to seal by integrally bonding the display side substrate 1a and the rear side substrate 1b via the spacers 4 is applied to the inner surface of either one of the display side substrate 1a and the rear side substrate 1b (here, the display side substrate 1a is selected for explanation). The form of applying the seal material is a bounding rectangle form which lacks a portion corresponding to a liquid crystal injection slit 2a for injecting the liquid crystal 3 in the step of injecting the liquid crystal discussed below. Note that, in FIG. 1(a), an open state of the liquid crystal injection slit 2a is shown for ease of explanation, but in reality, the liquid crystal injection slit 2a is sealed in a complete state of the liquid crystal display element 10.

The seal material can be applied by methods such as a screen printing method and a drawing method by means of a dispenser. In addition, as a seal material, materials having desirable bond strength and moisture resistance such as thermosetting resin (for example, thermosetting epoxies resin) or UV setting resin (for example, acrylic UV setting resin) may be adopted.

In the step of spraying spacers, the spacers 4 are sprayed on the inner surface of either the display side substrate 1a or the rear side substrate 1b to which the seal material is not applied (here, the rear side substrate 1b is selected for explanation). As a spraying method of the spacers 4, a dry spraying method is adopted here. That is, water or an alcoholic blended solution, in which spacers 4 are dispersed, is sprayed to the rear side substrate 1b, thus spraying the spacers 4. Note that, as a method of spraying the spacers 4, a dray spraying method for directly spraying spacers 4 in a state of fine particles to the rear side substrate 1b, using air-flow of compressed dry nitrogen, etc., may be adopted.

In an Example which will be explained later, the liquid crystal display element 10 is formed by changing the density of the spacers 4 (numerical density, the number of pieces to be dispersed) in a range of 50 pieces/mm$^2$ to 500 pieces/mm$^2$. Thus, in order to set the density of the spacers 4 on the rear side substrate 1b at a predetermined value, spraying time for spraying the spacers 4 by the foregoing spraying method may be adjusted. Namely, since the density of the spacers 4 on the rear side substrate 1b is substantially proportional to a value obtained by multiplying the density of the spacers 4 in a solvent by the spraying time, adjustment of the spraying time adjusts the density of the spacers 4 on the rear side substrate 1b.

In the step of bonding substrates, the display side substrate 1a to which the seal material was applied is overlaid on the rear side substrate 1b to which the spacers 4 were sprayed, through accurate registration. Further, in order to allow the cell gap d which is a gap between the pair of substrates 1 to be a predetermined value, pressure is applied to the overlaid pair of substrates 1 in a direction of its thickness.

In the present liquid crystal display element 10, as explained, the spacers 4 each of which has a larger particle diameter than the cell gap d at completion (this value is determined as a setting value) are used. Consequently, by applying pressure to the pair of substrates 1 in the direction of its thickness so that the cell gap d becomes the setting value in the present step, as explained, the spacers 4 and the pair of substrates 1 are partially elastic-deformed.

With this state, entering the next step of setting the seal material, the seal material is set so as to form a liquid crystal panel. Here, when using a thermosetting resin as the seal material, the seal material can be set by application of heat. In addition, when using a UV setting resin as the seal material, the seal material can be set by exposure of ultraviolet rays.

After thus setting the seal material, the pressure which was applied to maintain the cell gap d is removed, and portions subjected to elastic deformation (such as the concave portions 1c) in the spacers 4 and the pair of substrates 1 are returned to their original states. Accordingly, on a portion which is located particularly away from the seal 2, the cell gap d is slightly increased. Such a variation in the cell gap d in accordance with the location of the liquid crystal panel is corrected in the step of injecting the liquid crystal which will be explained below.

In the step of separating a panel, the liquid crystal panel is separated into a predetermined size. Separation is required in such case where a plurality of liquid crystal panels are formed on the pair of substrates 1. This step of separating the panel is suitably carried out depending on designing and manufacturing conditions.

In the step of injecting the liquid crystal, the liquid crystal 3 is injected to a portion between the pair of substrates 1 of the liquid crystal panel (inside the liquid crystal panel). The injection of the liquid crystal 3 to the liquid crystal panel is carried out by a vacuum injection method which utilizes a capillary tube phenomenon and a difference in pressure.

More specifically, first, the liquid crystal panel is provided inside a vacuum tank, and a vacuum of the degree of 1 Pa is produced inside the vacuum tank, thereby producing the vacuum inside the liquid crystal panel to which the liquid crystal 3 is to be injected. Next, the liquid crystal injection slit 2a of the liquid crystal panel is soaked in a liquid crystal pool. Then, a gas such as gaseous nitrogen is introduced to the vacuum tank so as to gradually increase pressure inside the vacuum tank. This results in a difference in pressure between inside and outside of the liquid crystal panel, and the difference in pressure and the capillary tube phenomenon due to the cell gap Cg cause the liquid crystal 3 to enter the inside of the liquid crystal panel. Further, atmospheric pressure is restored inside the vacuum tank, and while stopping the entry of the liquid crystal 3 into the liquid crystal panel, the liquid crystal panel is removed out of the vacuum tank.

Next, in the step of sealing the injection slit, the liquid crystal injection slit 2a is sealed. Here, the liquid crystal panel to which the liquid crystal 3 was injected is, as explained, the cell gap d exceeds the setting value in the central portion of the liquid crystal panel in particular. Therefore, when sealing the liquid crystal injection slit 2a, pressure is applied again to the liquid crystal panel in the direction of the thickness of the pair of substrates 1 (in a direction perpendicular to a surface of the liquid crystal panel), thus adjusting so that the cell gap d coincides with the setting value in the complete state of the liquid crystal panel.

Note that, when removing the pressure applied here, a restoring force due to elastic deformation of the display side substrate 1a and the rear side substrate 1b and the like causes the liquid crystal panel to be restored in the direction of thickness (increase thickness). By taking into consideration such restoration, pressure is adjusted so that the cell gap d under the pressure becomes slightly smaller than the actual setting value.

By the application of pressure, the liquid crystal 3 in excess is discharged from the liquid crystal injection slit 2a. Then, after wiping off the liquid crystal 3 in excess which is adhered to the liquid crystal injection slit 2a while maintaining the pressure at the time of discharge of the liquid crystal, the UV setting resin (seal material) is applied to the liquid crystal injection slit 2a, thereby reducing pressure to be applied to the liquid crystal panel to $2/3$ the pressure at the time of discharge of the liquid crystal while allowing the seal material (sealing resin) made of UV setting resin to penetrate the cell gap Cg. After penetration of the UV setting resin, portions to which the UV setting resin is applied are exposed to ultraviolet rays, thereby sealing the liquid crystal injection slit 2a. Preferably, pressure at the time of discharging the liquid crystal is in a range of 30 kPa to 50 kPa (about 0.3 kgf/cm$^2$ to 0.5 kgf/cm$^2$), and pressure at the time of penetration of the seal material is in a range of 20 kPa to 33 kPa (about 0.2 kgf/cm$^2$ to 0.3 kgf/cm$^2$), which is $2/3$ the pressure at the time of discharging the liquid crystal. Taking into consideration the foregoing restoration, these values of pressure are adjusted so that the cell gap d coincides with the setting value in the complete state of the liquid crystal display element 10.

Thus, by sealing the liquid crystal injection slit 2a in such a state that pressure was applied to the liquid crystal panel so as to adjust the cell gap d, the liquid crystal panel is restored in the direction of thickness when removing the pressure applied to the liquid crystal panel. This results in a slight reduction in pressure inside the liquid crystal panel with respect to atmospheric pressure, thereby applying an isotropic load to the display side substrate 1a and the rear side substrate 1b. Consequently, a variation in the cell gap d due to the location of the liquid crystal panel as explained is corrected, thus adjusting the cell gap d to uniformly have a predetermined value over the entire liquid crystal panel.

Note that, in the liquid crystal display element 10 manufactured through the foregoing manufacturing steps, the pressure inside the liquid crystal panel is slightly reduced with respect to atmospheric pressure. However, in the present liquid crystal display element 10, as discussed below, sufficient stiffness is maintained by adjusting the density of the spacers 4 while suppressing deformation of the pair of substrate 1, thereby suppressing change in pressure inside the liquid crystal panel to be small while suppressing generation of bubbles under conditions such as a high temperature.

The following will summarize the main points of the manufacturing steps of the present liquid crystal display element 10 explained above. The spacers 4 are sprayed to the inner surface of the rear side substrate 1b so as to obtain an appropriate density which will be explained below. The rear side substrate 1b is bonded with the display side substrate 1a to which the seal material is applied, thereby forming the liquid crystal panel. The liquid crystal is injected to this liquid crystal panel by the vacuum injection method. Then, pressure is applied to the liquid crystal panel from outside so as to discharge the liquid crystal 3 in excess, and the UV setting resin is applied to the liquid crystal injection slit 2a while applying the pressure. Thereafter, the pressure which is applied to the liquid crystal panel is reduced to about $2/3$ the pressure at the time of discharging the liquid crystal so as to allow the UV setting resin to penetrate the cell gap Cg from the liquid crystal injection slit 2a. Then, the liquid crystal injection slit 2a is exposed to ultra-violet rays so as to set the UV setting resin, thereby sealing the liquid crystal injection slit 2a. Note that, the pressure to be applied to the liquid crystal panel is adjusted so as to obtain a relationship between the cell gap d and a spacer particle diameter x, which will be explained below.

EXAMPLES

Next, the following will explain a relationship between the density of spacers 4 and the property of a liquid crystal display element. Here, a degree of generation of bubbles due to mechanical impact (a characteristic of resistance to a mechanical impact bubbles) and a degree of occurrence of color shading due to pressure (a characteristic of resistance to pressure) were checked.

Note that, here, a liquid crystal display element composed of an STN type liquid crystal cell is adopted as the liquid crystal display element 10.

Further, as the pair of substrates 1, plastic plates made of polyethersulfone (elastic modulus of $2.35 \times 10^9$ N/m$^2$) having the thickness of 0.2 mm are adopted. As the spacers 4, Micropearl SP20625 manufactured by Sekisui Chemical Co., Ltd., each of which having an elastic modulus of $4.70 \times 10^9$ N/m$^2$ and a particle diameter of 6.25 $\mu$m are adopted. Consequently, the elastic modulus of the spacers 4 is larger than that of the pair of substrates 1.

Note that, other materials which may be adopted as the pair of substrates 1 include: for example, polycarbonate, polyarylate, epoxy, acrylic, epoxy/acrylic copolymer, polyethylene terephthalate, polyethylene naphtalate, polyether imide, polysulfone, and the like. In addition, materials which may be adopted to produce the spacers 4 include, for example, silica, polysiloxane and the like, or divinylbenzene, homopolymer such as acrylic monomer or styrene, and copolymer thereof.

In the case of the foregoing, according to the Hooke's law, based on a ratio of compression elastic modulus, the amount of deformation of the spacers 4 becomes almost ½ the amount of deformation of the display side substrate 1$a$ or the rear side substrate 1$b$. Since the spacers 4 are spheres and the display side substrate and the rear side substrate 1$b$ are flat, the spacers 4 being spherical in shape sink into flat planes of the display side substrate 1$a$ and the rear side substrate 1$b$.

With the foregoing, a liquid crystal display element having the cell gap d of 6.0 $\mu$m was manufactured.

First, the degree of bubble generation due to mechanical impact will be explained. As explained in the Background of the Invention, when the number of the spacers 4 are excessive, a relative amount of the liquid crystal 3 within the cell gap Cg decreases. In addition, the liquid crystal in particular is maintained under a low temperature, and when the liquid crystal 3 itself shrinks to a large extent, bubbles in the vacuum region (space in which the liquid crystal 3 is eliminated and gas is hardly included) are generated due to mechanical impact from outside, which is not preferable.

Figure 2:
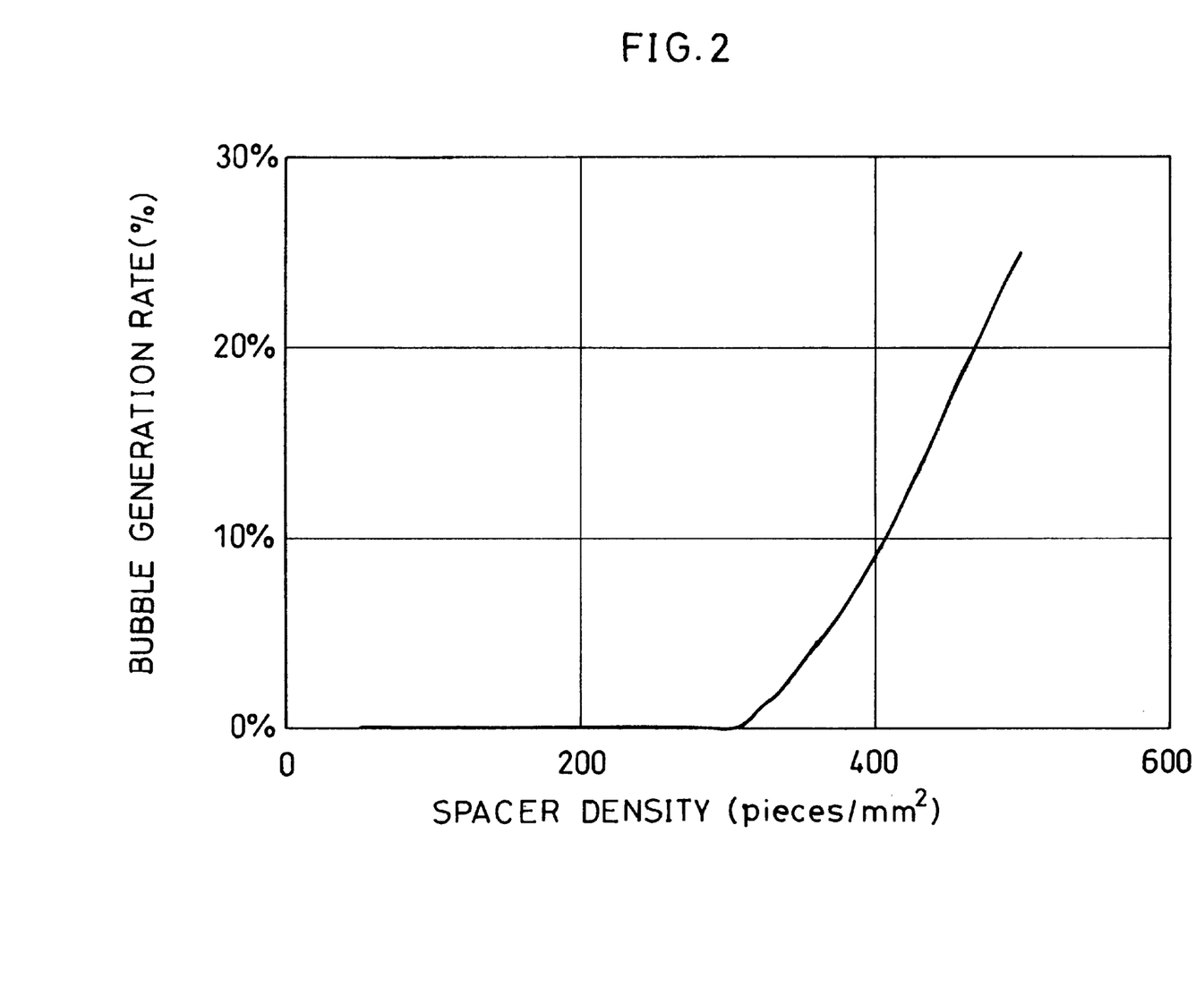
FIG. 2 is a graph showing variations in a bubble generation rate with respect to variations in a spacer density.

Therefore, the foregoing liquid crystal display element was formed by changing the density of the spacers 4 in a range of 50 pieces/mm$^2$ to 500 pieces/mm$^2$, respectively. Further, with respect to these liquid crystal display elements were given mechanical impact in the atmosphere of –20° C. so as to measure a bubble generation rate (%).

Here, the density of the spacers 4 is defined as a value which is obtained by dividing the number of pieces of the spacers 4 within the effective pixel area of the liquid crystal display element by an area of the effective pixel area. Note that, with respect to an actual liquid crystal display element, at predetermined five points in an area where the liquid crystal 3 is sealed, a value, which is obtained by dividing the number of pieces of the spacers 4 existing inside a circular area which has a diameter of 1 mm by an area of the circular area, is obtained, and an average value of the values at the five points was employed as the density of the spacers 4.

As a method of giving the mechanical impact, a display surface 1$d$ of the liquid crystal display element is horizontally provided with this side up, and a steel ball having a diameter of 1 cm is dropped from 30 cm above the display surface 1$d$ to the display surface 1$d$.

Further, the bubble generation rate is expressed as a percentage by the number of pieces of liquid crystal display elements which actually caused to generate bubbles with respect to the number of experiments with the liquid crystal display elements carried out.

FIG. 2 shows results of the above measurement. FIG. 2 is a graph showing variations in the bubble generation rate with respect to variations in the density of the spacers 4.

As is clear from FIG. 2, when the density of the spacers 4 is not more than 300 pieces/mm$^2$, the bubble generation rate is substantially 0%, that is, bubbles are not generated when giving a mechanical impact. In contrast, when the density of the spacers 4 exceeds 300 pieces/mm$^2$, the generation of bubbles was observed. In addition, the bubble generation rate becomes high in accordance with increase in the density of the spacers 4, and for example, when the density of the spacers 4 is 400 pieces/mm$^2$, the bubble generation rate is increased up to 10% or less.

Accordingly, in order to suppress the generation of bubbles due to mechanical impact under a low temperature in the liquid crystal display element, the density of the spacers 4 needs to be decreased. Particularly, it is preferable to set the density of the spacers 4 to be not more than 300 pieces/mm$^2$ because bubbles are hardly generated.

The following will consider a volume share of the spacers 4. The volume share of the spacers 4 is defined as percentage by volume occupied by all the spacers 4 included in a space which is enclosed by the pair of substrates 1 and the seal 2 (space where the liquid crystal 3 and the spacers 4 should be sealed) of the liquid crystal panel with respect to a volume of the space. In addition, the density of the spacers 4, 300 pieces/mm$^2$, is converted to the volume share of the spacers 4 which is about 0.64%. Consequently, it is preferable to set the volume share of the spacers 4 to be not more than about 0.64% because bubbles are hardly generated. A relationship between the generation of bubbles and the volume share of the spacers 4 generally holds regardless of values such as the particle diameter of the spacers 4, the cell gap d.

Note that, the volume share of the spacers 4 is calculated based on the cell gap d (here, 6.0 $\mu$m) of the liquid crystal panel, the particle diameter (here, 6.25 $\mu$m) of the spacers 4 and the density of the spacers 4. Here, since deformation of the spacers 4 and the like is minute, the volume of the spacers 4 approximates at the volume of the spacers 4 being spherical in shape prior to deformation.

Specifically, when the particle diameter of the spacers 4 is x mm, the cell gap d is d mm, and the density of the spacers 4 is n pieces/mm$^2$, an average value v mm$^3$ of the entire volume of the spacers 4 existing per unit area (S mm$^2$) of the display surface 1$d$ is given by $$v = 4\pi \cdot (x/2)^3 \cdot n \cdot S/3.$$

Further, since a volume V mm$^3$ of a space between the pair of substrates 1 per unit area of the display surface 1$d$ is given by $$V = d \cdot S,$$

a volume share Ov % of the spacers 4 is given by $$Ov = v/V = 4\pi \cdot (x/2)^3 \cdot n/3/d \times 100.$$

Next, the following will consider an area share of the spacers 4. The area share of the spacers 4 is defined as percentage by an area of all the spacers 4 included in an area of the liquid crystal panel, in which the liquid crystal 3 is sealed, to be projected on the display surface 1*d* with respect to an area of the area of the liquid crystal panel. In addition, when converting the density of the spacers 4 that is 300 pieces/mm² to the area share of the spacers 4, it becomes about 0.92%.

Note that, the area volume of the spacers 4 is also obtained by approximation as in the case of the volume share. Specifically, an area share Os % of the spacers 4 is given by $$Os=\pi \cdot (x/2)^2 \cdot n \times 100.$$

Thus, when the density of the spacers 4 is not more than 300 pieces/mm², the area share of the spacers 4 becomes not more than 0.92%. In that case, since the area share of the spacers 4 is sufficiently small, an influence such as scattering of light by the spacers 4 is also sufficiently small. Therefore, by setting the density of the spacers 4 to be not more than 300 pieces/mm², reduction in contrast can be suppressed.

Namely, the present liquid crystal display element 10 includes the pair of substrate 1 made of plastic, the liquid crystal 3 sandwiched between the pair of substrates 1, and the plurality of spacers 4, and it is preferable that the volume share of the spacers 4 with respect to a space between the pair of substrates 1 which is to hold the liquid crystal 3 and the plurality of spacers 4 is not more than about 0.64%.

Accordingly, the generation of bubbles and reduction in contrast when giving mechanical impact to the liquid crystal display element 10 under a low temperature can be prevented, thereby improving display quality of the liquid crystal display element 10.

Next, the following will explain a degree of generation of color shading due to pressure. As explained in the Background of the Invention, when the number of the spacers 4 is exceedingly small, support between the pair of substrates 1 is reduced. Therefore, the cell gap d is likely to vary due to pressure and the like, while allowing color shading to easily occur in the display of the liquid crystal display element.

Such color shading is likely to occur particularly when, as in the present liquid crystal display element 10, using the display side substrate 1*a* and the rear side substrate 1*b* which are made of a material such as plastic having smaller stiffness than a material such as glass. In addition, as in the present liquid crystal display element 10, the STN type liquid crystal cell is likely to cause color shading to be particularly outstanding.

Figure 3:
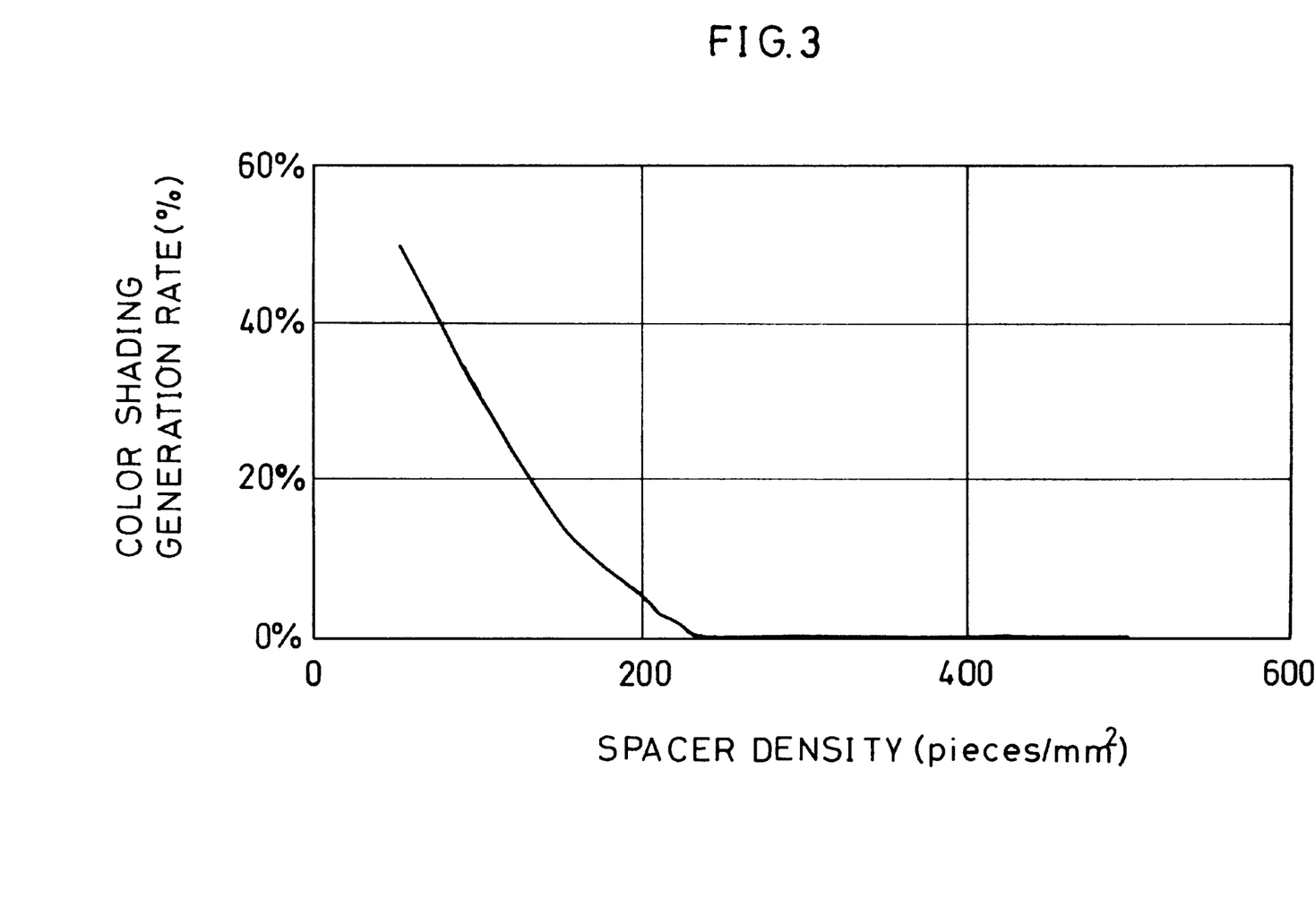
FIG. 3 is a graph showing variations in a color shading generation rate with respect to the variations in the spacer density.

Accordingly, a color shading generation rate (%) was evaluated by performing an experiment as in the case of the bubble generation rate. Note that, in this experiment, with respect to the foregoing experiment, a temperature of the atmosphere in which the liquid crystal display element is provided is changed to a room temperature (25° C.). Other conditions and methods are the same as those in the foregoing experiment.

Here, the color shading generation rate is expressed as percentage by the number of pieces of liquid crystal display elements in which color shading was actually generated with respect to the number of experiments with the liquid crystal display elements carried out.

FIG. 3 shows results of the above evaluation. FIG. 3 is a graph showing variations in the color shading generation rate with respect to variations in the density of the spacers 4.

As is clear from FIG. 3, when the density of the spacers 4 is not less than 240 pieces/mm², the color shading generation rate is substantially 0%, that is, color shading is not generated when applying pressure to the display surface 1*d* of the liquid crystal display element. In contrast, when the density of the spacers 4 is less than 240 pieces/mm², color shading is generated. In addition, the color shading generation rate increases in accordance with decrease in the density of the spacers 4.

Thus, when the density of the spacers 4 is not less than 240 pieces/mm², stiffness of the liquid crystal display element is increased, and the deformation of the pair of substrates 1 with respect to pressure and the like is suppressed, thereby suppressing variations in the cell gap d while preventing the generation of color shading.

Accordingly, in order to suppress generation of color shading due to pressure in the liquid crystal display element 10, the density of the spacers 4 needs to be increased. Particularly, it is preferable to set the density of the spacers 4 to be not less than 240 pieces/mm² because the generation of color shading is hardly observed.

Figure 4:
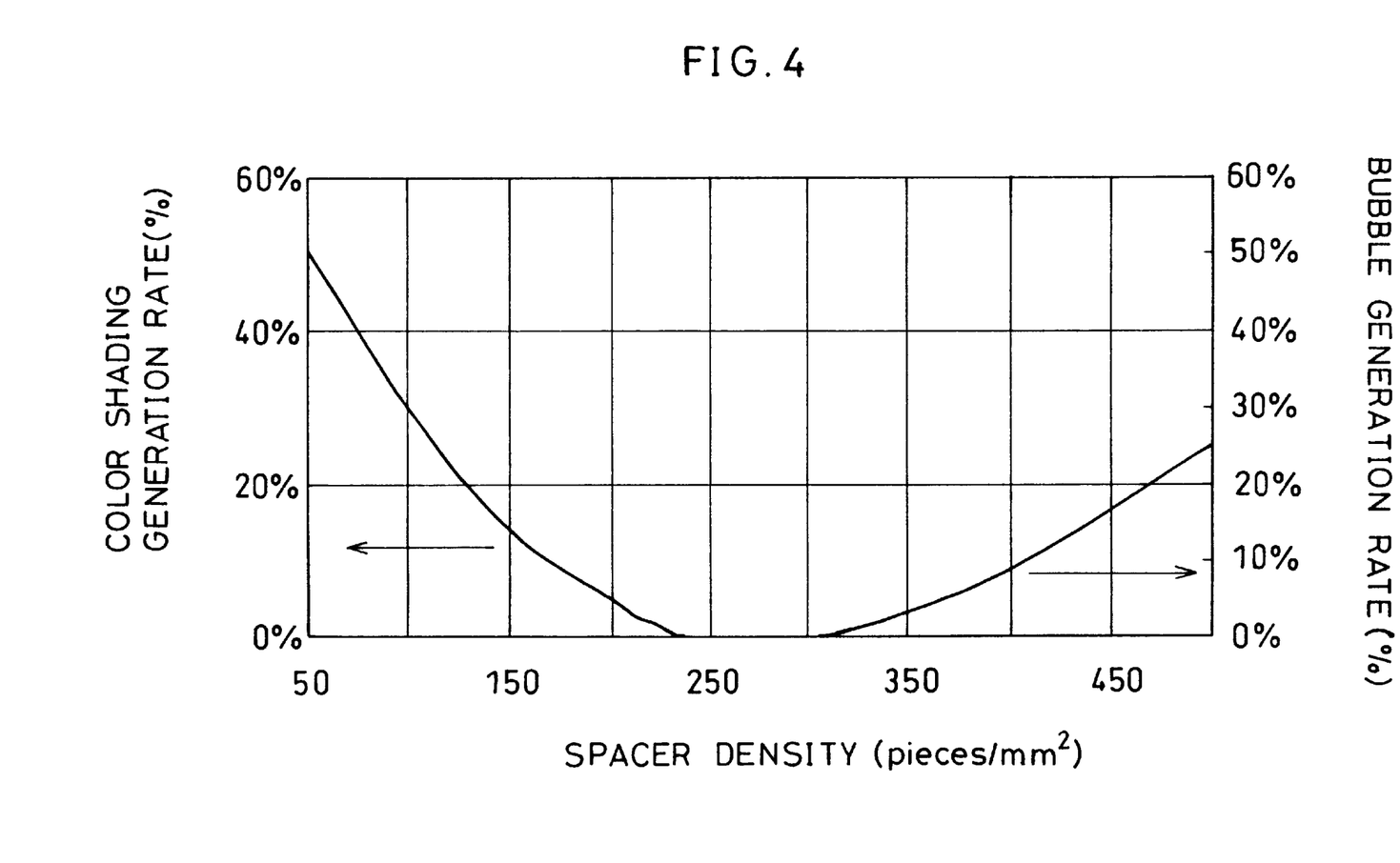
FIG. 4 is a graph showing variations in the color shading generation rate and the bubble generation rate with respect to the variations in the spacer density.

FIG. 4 shows a summary of variations in the bubble generation rate and the color shading generation rate obtained as above. FIG. 4 is a graph showing variations in the color shading generation rate and the bubble generation rate with respect to variations in the density of the spacers 4. According to FIG. 4, by setting the density of the spacers 4 to be not less than 240 pieces/mm² and not more than 300 pieces/mm², the generation of bubbles when giving mechanical impact and the generation of color shading due to pressure and the like can be prevented.

Figure 5:
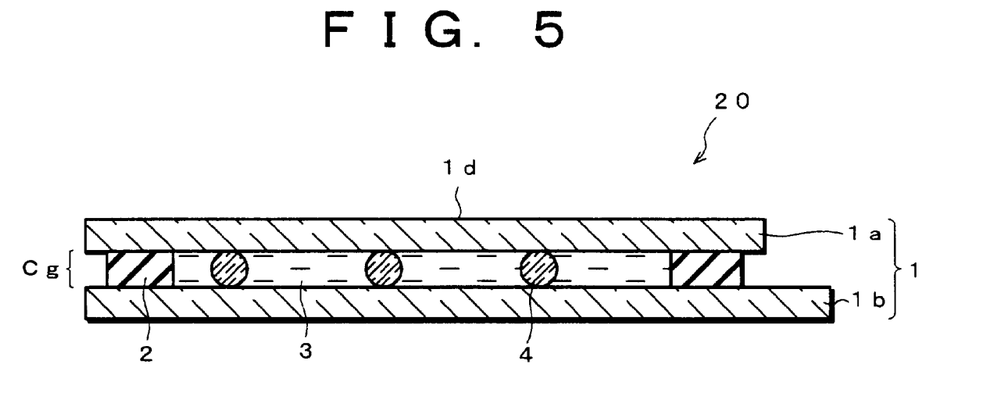
FIG. 5 is a cross sectional view showing a liquid crystal display element formed by using a spacer whose particle diameter is equal to a cell gap.

Next, in order to investigate an influence due to a relationship between the cell gap d and the spacers 4, the particle diameter of the spacers 4 is changed so as to form a liquid crystal display element 20. First, the liquid crystal display element 20 was formed, using a plurality of spacers 4 having the same value as the cell gap d. Specifically, the cell gap d and the particle diameter of the spacers 4 are both set to be 6.0 $\mu$m. Further, the density of the spacers 4 is set to be 260 pieces/mm².

Figure 1:
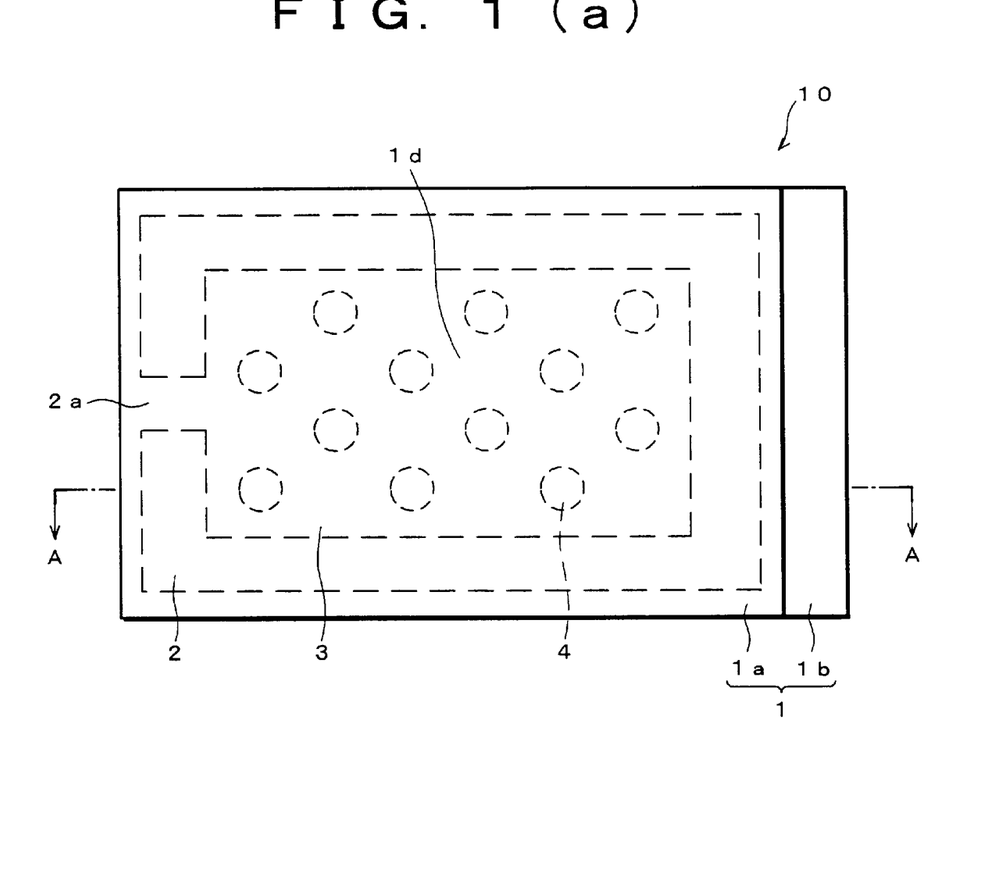
FIG. 1(a) is a plan view of a liquid crystal display element in the present embodiment.
FIG. 1(b) is a cross sectional view of the liquid crystal display element of FIG. 1(a) taken along the line A—A.

The liquid crystal display element 20 is to have a cross sectional form as shown in FIG. 5. Here, FIG. 5 is a cross sectional view of the liquid crystal display element 20 formed by using a plurality of spacers 4 having the same particle diameter as the cell gap d, which corresponds to FIG. 1(*b*). Note that, a plan view of the liquid crystal display element 20 is the same as FIG. 1(*a*).

Since, in the liquid crystal display element 20, the cell gap d and the particle diameter of the spacers 4 are substantially the same, the pair of substrates 1 and the spacers 4 are hardly deformed. Therefore, it is maintained that the inner surfaces of the pair of substrates 1 are flat, and the spacers 4 are spheres. Consequently, the concave portions 1*c* of FIG. 1(*b*) are not formed, and the force of the pair of substrates 1 to hold the spacers 4 in the direction of a surface is small.

Thus, in the present liquid crystal display element 20, the spacers 4 are likely to move due to an impact from outside. Consequently, compared with the foregoing liquid crystal display element 10 (see FIG. 1(*b*)), in the present liquid crystal display element 20, the cell gap d becomes uneven and color shading is likely to be generated.

In contrast, in the liquid crystal display element 10, the particle diameter of the spacers 4 is set to be larger than the cell gap d. Moreover, the pair of substrates 1 and the spacers 4 are elastic-deformed at portions where they come in contact one another. Consequently, the spacers 4 are held by the pair of substrates 1 more firmly, and as a result, the spacers 4 are not likely to move due to an impact from outside. That is, in the liquid crystal display element 10, color shading is less likely to be generated due to pressure, compared with the liquid crystal display element 20.

Particularly, in the liquid crystal display element 10, the elastic modulus of the spacers 4 is set to be larger than the elastic modulus of the display side substrate 1a or the rear side substrate 1b, thereby forming the concave portions 1c on the display side substrate 1a and the rear side substrate 1b. The concave portions 1c have such an effect that the display side substrate 1a and the rear side substrate 1b hold the spacers 4 more firmly, and therefore, such an arrangement can further suppress the generation of color shading due to pressure.

Next, the spacers 4 having a larger particle diameter than that of the liquid crystal display element 10, which is specifically the particle diameter of 6.75 μm, are used to form a liquid crystal display element. Here, the density of the spacers 4 is set to be 260 pieces/mm$^2$.

In this case, in order to set the cell gap d to be 6.0 μm, the pair of substrates 1 and the spacers 4 require to be largely deformed, and it was difficult to adjust the cell gap d uniformly to be 6.0 μm.

Further, in this liquid crystal display element, the foregoing bubble generation rate due to mechanical impact in the atmosphere of −20° C. could not be suppressed. Since spacers 4 having a relatively large particle diameter (6.75 μm) are used to set the cell gap d to be 6.0 μm, pressure applied to the liquid crystal 3 sealed inside is excessively reduced, and further, the liquid crystal 3 shrinks under a low temperature, and thereby bubbles in the vacuum region are likely to be generated due to a mechanical impact.

Further, in this liquid crystal display element, since the amount of deformation of the inner surfaces of the pair of substrates is large, the transparent electrodes formed on the inner surfaces of the pair of substrates 1 are damaged, thereby partially breaking the electrodes.

Here, considering a deformation rate x/d which is a ratio of a particle diameter x of the spacers 4 to the cell gap d, the amount of deformation on the inner surfaces of the pair of substrates 1 increases as the value of x/d increases. Therefore, when forming the liquid crystal display element by changing the deformation rate x/d, it becomes difficult to uniformly adjust the cell gap d to be a predetermined value when the deformation rate x/d exceeds 1.1, and damages occur in the transparent electrodes.

Figure 6:
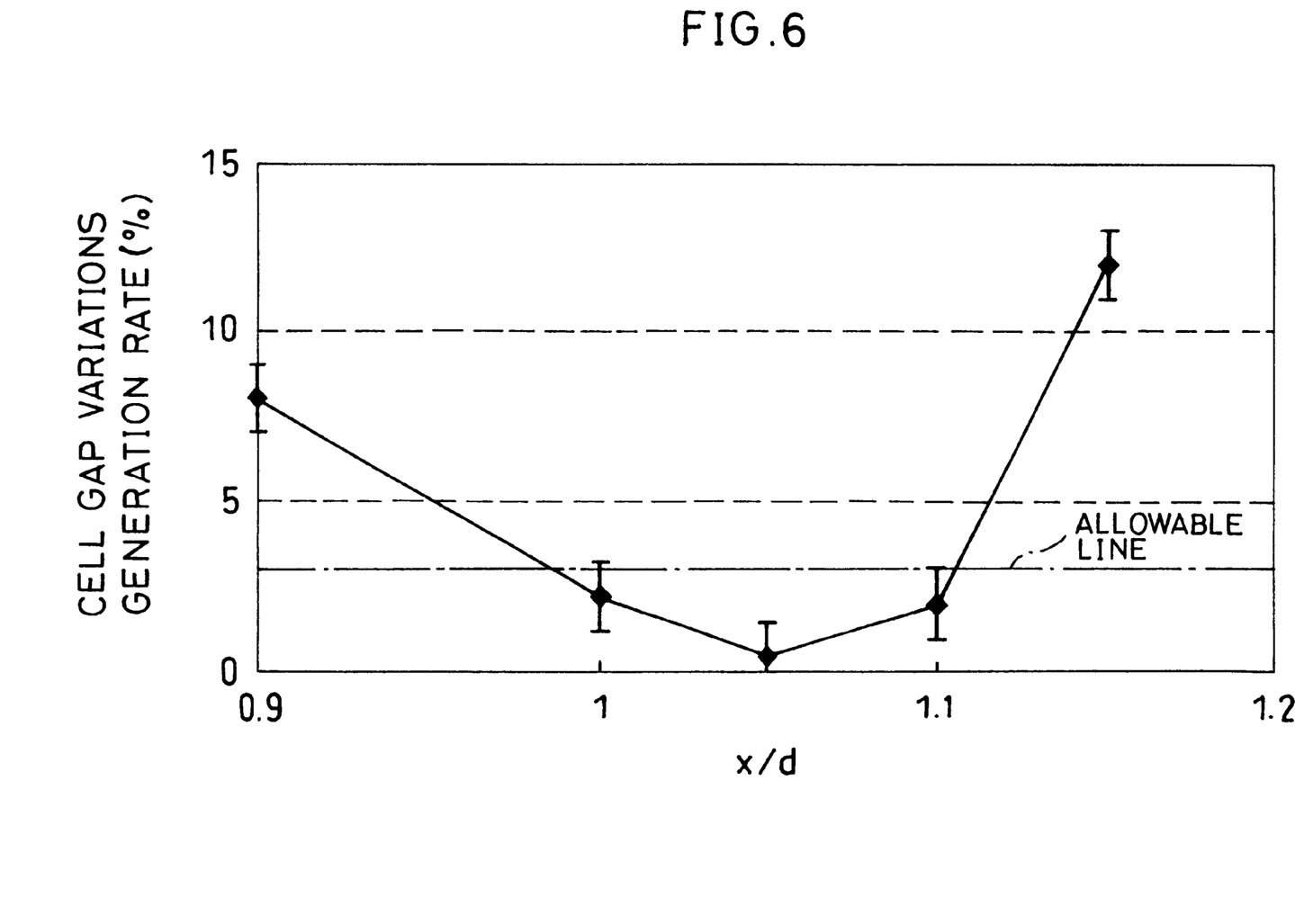
FIG. 6 is a graph showing variations in a cell gap variations generation rate with respect to variations in a value of (spacer particle diameter: x)/(cell gap: d).

FIG. 6 is a graph showing variations in a cell gap variation generation rate with respect to variations in the value of x/d. Here, the cell gap variation generation rate is expressed as a percentage by the number of pieces of liquid crystal display element in which cell gap variations were actually generated with respect to the number of experiments with the liquid crystal display elements carried out. Further, the cell gap variations are to show nonuniformity in the cell gap d, and in case where color shading is generated at completion of a liquid crystal display element, the liquid crystal display element was regarded as having the cell gap variations. Note that, the foregoing investigation on the cell gap variation generation rate was performed for every manufacture lot, and an error bar shown in FIG. 6 shows variations among respective lots. Theses variations reflect factors which are other than those caused by the spacers 4.

According to FIG. 6, as the value of x/d increases it becomes difficult to adjust the cell gap d, and the cell gap variation which is nonuniformity in the cell gap d is generated in the liquid crystal display element. In addition, as shown in FIG. 6, when x/d exceeds 1.1, the cell gap variation generation rate drastically increases. The cell gap variation generation rate is not 0% even when x/d=1.1, but such a generation rate is within an allowable range. For this reason, it is preferable to set the deformation rate x/d to be not more than 1.1. Note that, the allowable range of the cell gap variation generation rate is determined to be not more than 3% in the light of a conforming item ratio.

Consequently, the liquid crystal display element 10 (see FIGS. 1(a) and 1(b)) according to the present embodiment includes a pair of substrates 1 made of plastic, a liquid crystal 3 and a plurality of spacers 4 sandwiched between the pair of substrates 1, and it is preferable that thickness of the plurality of spacers 4 in such a direction that the plurality of spacers 4 are held by the pair of substrates 1, which is a thickness (particle diameter) in such a state that is not held by the pair of substrates 1 is set to be not more than 1.1 times a distance (cell gap d) between surfaces (inner surfaces) of the pair of substrates facing each other.

Consequently, excessive deformation of substrates and spacers can be prevented, thereby avoiding the foregoing problems.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A liquid crystal display element, comprising:
   a pair of substrates made of plastic;
   a liquid crystal sandwiched between said pair of substrates; and
   a plurality of spacers for maintaining a gap d between said pair of substrates, which are sandwiched between said pair of substrates;
   wherein, when x is an average value of thickness of the plurality of spacers in a state without a load in such a direction that said plurality of spacers are sandwiched between said pair of substrates, d<x≦1.1d is satisfied.

2. The liquid crystal display element as set forth in claim 1, wherein a numerical density of said plurality of spacers is not less than 240 pieces/mm$^2$ and not more than 300 pieces/mm$^2$.

3. The liquid crystal display element as set forth in claim 1, wherein an elastic modulus of said plurality of spacers is larger than an elastic modulus of said pair of substrates.

4. The liquid crystal display element as set forth in claim 2, wherein an elastic modulus of said plurality of spacers is larger than an elastic modulus of said pair of substrates.

5. A manufacturing method of a liquid crystal display element which includes a pair of substrates made of plastic, a plurality of spacers for maintaining a gap between the pair of substrates and a liquid crystal between the pair of substrates, comprising the steps of:
   (a) disposing said plurality of spacers between said pair of substrates, and forming a liquid crystal injection slit for injecting the liquid crystal between said pair of substrates while bonding said pair of substrates with a seal material which is provided around a region where said plurality of spacers are disposed;
   (b) injecting the liquid crystal between said pair of substrates via said liquid crystal injection slit; and
   (c) sealing said liquid crystal injection slit while adjusting pressure which is applied to said pair of substrates so as to adjust the gap between said pair of substrates in which the liquid crystal was injected,
   wherein:
      when x is an average value of thickness of the plurality of spacers in a state without a load in such a direction that said plurality of spacers are sandwiched between said pair of substrates, when adjusting said pressure, the gap d between said pair of substrates at completion of the liquid crystal display element is adjusted so as to satisfy d<x≦1.1d.

6. The manufacturing method of the liquid crystal display element as set forth in claim 5, wherein said plurality of spacers are disposed between said pair of substrates so that a numerical density thereof becomes not less than 240 pieces/mm² and not more than 300 pieces/mm².

7. The liquid crystal display element as set forth in claim 1, wherein an elastic modulus of said plurality of spacers is larger than an elastic modulus of one of said pair of substrates.

8. The liquid crystal display element as set forth in claim 1, wherein a numerical density of said plurality of spacers is not less than 240 pieces/mm², while a ratio of a volume constituted by said plurality of spacers to a volume constituted by the liquid crystal and the plurality of spacers sandwiched between said pair of substrates is not more than 0.64%.

9. The liquid crystal display element as set forth in claim 1, wherein at least either one of said pair of substrates is made of polyethersulfone.

10. The liquid crystal display element as set forth in claim 1, wherein said liquid crystal composes an STN type liquid crystal cell.

11. The manufacturing method of the liquid crystal display element as set forth in claim 5, wherein, in said step (c), pressure is applied to said pair of substrates so that the gap between said pair of substrates becomes smaller than the gap at completion of the liquid crystal display element, then, said liquid crystal injection slit is coated with the seal material, then, the pressure applied to said pair of substrates is reduced so as to allow said seal material to penetrate the gap from said liquid crystal injection slit, then, said seal material is set.

12. The manufacturing method of the liquid crystal display element as set forth in claim 11, wherein, in said step (c), the pressure applied to said pair of substrates so that the gap between said pair of substrates becomes smaller than the gap at completion of the liquid crystal display element is in a range of 30 kPa to 50 kPa.

13. A liquid crystal display element consisting essentially of:
  a pair of substrates having opposing an inner surfaces, wherein
    (a) an electrode is formed on each of the opposing inner surfaces,
    (b) each of the pair of substrates is made of plastic, and
    (c) at least one of a switching element, a color filter, and an orientating film is formed on at least one of the opposing inner surfaces;
  a liquid crystal sandwiched between said pair of substrates; and
  a plurality of spacers for maintaining a gap d between said pair of substrates, which are sandwiched between said pair of substrates,
  wherein when x is an average value of thickness of the plurality of spacers in a state without a load in such a direction that said plurality of spacers are sandwiched between said pair of substrates, d<x≦1.1d is satisfied.

14. The liquid crystal display element as set forth in claim 13, wherein a numerical density of said plurality of spacers is not less than 240 pieces/mm² and not more than 300 pieces/mm².

15. The liquid crystal display element as set forth in claim 13, wherein an elastic modulus of said plurality of spacers is larger than an elastic modulus of said pair of substrates.

16. The liquid crystal display element as set forth in claim 14, wherein an elastic modulus of said plurality of spacers is larger than an elastic modulus of said pair of substrates.

17. The liquid crystal display element as set forth in claim 13, wherein an elastic modulus of said plurality of spacers is larger than an elastic modulus of one of said pair of substrates.

18. The liquid crystal display element as set forth in claim 13, wherein a numerical density of said plurality of spacers is not less than 240 pieces/mm², while a ratio of a volume constituted by said plurality of spacers to a volume constituted by the liquid crystal and the plurality of spacers sandwiched between said pair of substrates is not more than 0.64%.

19. The liquid crystal display element as set forth in claim 13, wherein at least either one of said pair of substrates is made of polyethersulfone.

20. The liquid crystal display element as set forth in claim 13, wherein said liquid crystal composes an STN type liquid crystal cell.

* * * * *